…

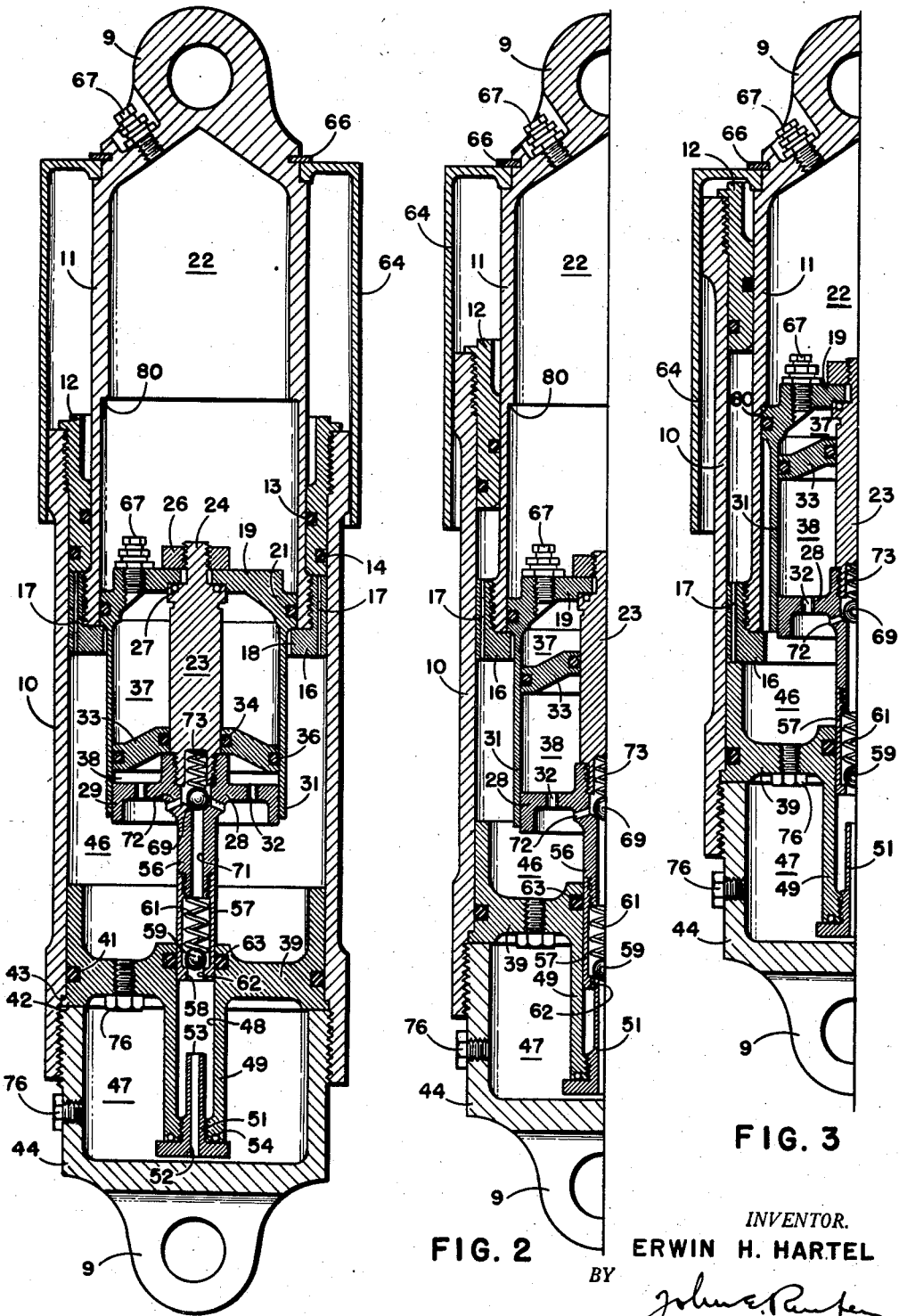

United States Patent Office 2,892,625
Patented June 30, 1959

2,892,625
SELF CHARGING AIR-OIL SHOCK ABSORBER

Erwin H. Hartel, Cleveland, Ohio, assignor to Cleveland Pneumatic Industries, Inc., a corporation of Ohio Application March 8, 1955, Serial No. 492,830

7 Claims. (Cl. 267—64)

This invention relates to wheel shock absorbers and more particularly to a self-charging air-oil shock absorber.

It is an important object of this invention to provide a shock absorber mechanism which automatically replenishes the fluid in a shock absorber to replace any lost by leakage.

It is another object of this invention to provide a shock absorber which automatically maintains the static position of the shock absorber at the desired level.

It is still another object of this invention to provide a shock absorber and spring combination wherein means are provided to increase the load stroke efficiency when the impact velocity absorbed by the device increases.

It is still another object of this invention to provide an air-oil shock absorber having means to automatically pump the oil from the reservoir to the main shock absorber chamber to replenish any loss of oil due to leakage or the like.

Further objects and advantages will appear from the following description and drawings, wherein:

Figure 1 is a longitudinal section of the shock absorber according to this invention in its extended position;

Figure 2 is a fragmentary longitudinal section of the shock absorber shown in Figure 1 showing the position of the elements when the shock absorber is in its static position; and, Figure 3 is a fragmentary longitudinal section showing the position of the shock absorber elements when the unit is in its compressed position.

In the preferred form of this invention the shock absorber is provided with a tubular casing 10 and a telescoping plunger tube 11 each provided with a mounting portion 9 adapted to be connected to the vehicle structure. Mounted on the upper end of the casing 10 is a gland nut 12 provided with seals 13 and 14 engaging the walls of the plunger tube 11 and casing 10 respectively and preventing leakage therebetween. Threaded to the lower end of the plunger tube 11 is a piston head 16 which is provided with two or more damping orifices 17 and an inwardly extending end flange 18 against which a floating cylinder 19 seats when the shock absorber is in its extended position. A seal 21 carried by the floating cylinder 19 prevents leakage between the inner surface of the plunger tube 11 and the floating cylinder 19. The floating cylinder 19 in cooperation with the plunger tube 11 defines a high pressure chamber 22 which is isolated from the rest of the shock absorber fluid cavity.

A stem member 23 is formed with a threaded portion 24 extending through the end of the floating cylinder 19 and is provided with a nut fastener 26 which securely mounts the stem member on the floating cylinder. A seal 27 prevents leakage past the threaded portion 24. Threaded to the lower end of the stem member 23 is a plunger member 28 provided with a flange and skirt portion 29 which extends radially out into engagement with a cylindrical portion 31 formed on the floating cylinder 19. The flange and skirt portion 29 is provided with two or more orifices 32 which provide fluid communication through the plunger member 28 to the interior of the floating cylinder 19. Positioned around the stem member 23 is a floating piston 33 which is provided with seals 34 and 36 which engage the stem member 23 and cylindrical portion 31 respectively, dividing the zone within the cylindrical portion 31 into a pressure chamber 37 and a liquid chamber 38. The liquid chamber 38 is in communication with the lower side of the plunger member 28 through the orifices 32.

Mounted within the casing 10 is a bulkhead 39 provided with a seal 41 engaging the inner wall of the casing 10 and a radial flange 42 held against a shoulder 43 formed in the casing by an end member 44 which is threaded into the end of the casing 10. The gland nut 12, casing 10, bulkhead 39 and floating cylinder 19 cooperate to form a liquid chamber 46 in communication with the chamber 38 through the orifices 32. An oil reservoir 47 is defined by the bulkhead 39 and the end member 44. The bulkhead 39 is formed with an axially extending bore 48 which projects through an axially extending portion 49 and forms the cylinder of the mechanism used to pump oil from the reservoir 47 to the chamber 46. A stem seat member 51 is threaded into the lower end of the axially extending portion 49 and is provided with a central extending passage 52 terminating at its upper end in a valve seat 53 and at its lower end in the reservoir 47. A fluid seal 54 prevents leakage between the portion 49 and the stem seat member 51.

Threaded on the lower end of an axial projection 56 on the plunger member 28 is a cylindrical piston 57 formed with an inwardly extending end flange 58 against which a check valve 59 seats. A spring 61 extends between the check valve 59 and the projection 56 and urges the check valve into engagement with the flange 58. The flange 58 defines a central opening 62 which is sufficiently large to receive the upper end of the stem seat member 51 with clearance as best seen in Figure 2 and a fluid seal 63 prevents leakage between the walls of the bore 48 and the piston 57. A check valve 69 is positioned to normally seat against the upper end of an axially extending passage 71 formed in the projection 56 and prevent reversed flow from the chamber 46 through passage 72 and passage 71 toward the check valve 59. A spring 73 extends between the stem member 23 and the check valve 69 and resiliently urges the latter against its seat. Fill plugs 76 are used to fill the chambers 48 and 46 and the reservoir 47 with oil.

A skirt member 64 is mounted on the plunger tube 11 by a snap ring 66 and is adapted to receive the upper end of the casing 10 and prevent dirt from entering into the area above the gland nut 12. Charging fittings 67 are also provided in the plunger tube 11 and the floating cylinder 19 to permit the charging of the chambers 22 and 37 with a gas under pressure.

In vehicles of the type contemplated for installation of a shock absorber and spring according to this invention, shock impacts are normally in the category which produce a relatively low velocity in the shock absorber mechanism. However, on occasion, large impacts occur due to unusually large bumps and the like which produce high velocity in the shock absorber mechanisms. This shock absorber fully meets the problems presented by these various types of shock impacts by providing a high resistance to movement when the impact is relatively large and lower resistance to movement when the shock impact is smaller, thus producing a soft action when such action is practical and a harder action whenever necessary. Also the pumping mechanism functions during slow impact to replenish any oil which leaks from the chamber 46 past the seals 13 and 63. During the assembly of the shock absorber, the chamber 37 is charged with pressurized gas at a low pressure and the chamber 22 is charged with pressurized gas at a higher pressure. Also the chambers 46 and 38 are completely filled with oil, the various volumes and pressures being arranged so that when the plunger tube 11 moves downwardly relative to the casing 10 to the static position shown in Figure 2, oil flows from the chamber 46 through the orifices 32 into the chamber 38 thereby moving the floating piston 33 upwardly along the stem member 23 compressing the gas within the chamber 37 to the same pressure as the gas within the chamber 22. At this time the pressures within the chambers 22, 37, 38 and 46 are all substantially equal.

When the various elements are in the position shown in Figure 2, the oil within the bore 48 and in the passage 71 is isolated from the reservoir 47 by the seating of the check valve 59 on the seat 53. If there is insufficient oil within the chambers 46 and 38 at this time due to leakage past the seals further downward movement of the plunger tube 11 relative to the casing 10 will cause the piston 57 to compress the liquid within the bore 48 and pump it up through the passage 71 past the check valve 69 into the chamber 46 thereby replacing the lost oil.

If the chambers 46 and 38 contain sufficient oil to compress the gas within the chamber 37 to substantially the same pressure as the gas within the chamber 22 when the elements assume the static position shown in Figure 2, the pumping mechanism will not function to transfer oil from the reservoir 47 to the chamber 46. This is due to the fact that as soon as the pressure in the chamber 37 is the same as the pressure within the chamber 22, the effective area of the oil operating on the floating cylinder 19 is increased by an amount equal to the area of the floating piston 33 so that it approaches the effective area of the gas within the chamber 22 acting on the floating cylinder 19. Therefore, further motion of the plunger tube 11 downwardly relative to the casing 10 beyond the static position increases the pressure of the oil within the chamber 46 to a pressure higher than the gas pressure in the chamber 22 and causes the floating cylinder to move upwardly relative to the plunger tube 11 and casing 10 as shown in Figure 3. This can continue until the floating cylinder 19 abuts against a shoulder 80 formed in the plunger tube 11 which limits upward travel of the floating cylinder 19. It is, therefore, apparent that the pumping mechanism only functions to replace the liquid in the shock absorber which has leaked past the seals and that the pumping mechanism automatically becomes inoperative when the proper amount of liquid is present in the shock absorber.

When the shock absorber is absorbing low velocity impacts, the oil flows from the chamber 46 through the orifices 32 into the chamber 38 with a sufficient velocity to maintain the pressure within the chamber 38 substantially the same as the pressure within the chamber 46. Therefore, the initial portions of the stroke result in a compression of the gas within the chamber 37. Since the pressure within the chamber 37 is relatively low when the shock absorber is in the extended position, the gas absorbs only a relatively small amount of energy during the initial portions of the stroke. However, when the impact absorbed by the shock absorber is large resulting in a high velocity of movement of the plunger tube 11 relative to the casing 10, the orifice 32 acts as a throttle which prevents the pressure within the chamber 38 from building up to the same rate as the pressure within the chamber 46. If the velocity of the plunger tube 11 is great enough, the pressure within the chamber 46 builds up to a pressure higher than the pressure within the chamber 22 before the pressures within the chambers 38 and 37 reach the pressure of the chamber 22. Therefore, the effective area of the oil within the chamber 46 acting on the floating cylinder 19 approaches the effective area of the gas in the chamber 22 on the floating cylinder 19 before the elements assume the static position and result in a movement of the floating cylinder 19 upwardly relative to the plunger tube 11 and casing 10 early in the stroke. Such movement of the floating cylinder 19 relative to the plunger tube 11 results in compressing the gas within the chamber 22 in early portions of the stroke; and since the pressure within the chamber 22 is greater than the pressure within the chamber 37, a high resistance to motion of the plunger tube results. Of course, the pumping mechanism will not function on high velocity impacts due to the fact that the floating cylinder 19 moves upwardly relative to the plunger tube 11 before the static position of the elements is reached. Of course, the flow of oil through the orifices 17 to and from the zone above the piston head 16 absorbs energy in both types of operation.

It should be noted that overloading of this shock absorber is virtually impossible since there is always a column of compressible gas to cushion the impact thus preventing excessive pressures which would be possible if only liquids were used.

Those skilled in the art will recognize that the disclosed structure provides automatic means which are simple and essentially fool-proof for replacing the liquid which tends to leak through the seals of shock absorber units so that the proper amount of liquid is maintained within the shock absorber. Also means are provided which automatically adjust the resistance developed by the shock absorber to needs presented by a variety of shock loading.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A shock absorber comprising first and second telescoping members cooperating to define a fluid cavity, a floating element movable relative to said members carried by said first member separating a chamber from the remaining portions of said cavity, said chamber being charged with gas under pressure, one part of said remaining portions being filled with liquid and the other parts thereof wtih gas, a liquid reservoir in one of said members, and pumping means between said reservoir and said one part connected to said floating element, said pumping means being actuated by relative movement between said floating element and one member beyond a predetermined relative position for pumping liquid from said reservoir to said one part.

2. A shock absorber comprising first and second telescoping members cooperating to define a fluid cavity, a floating element movable relative to said members carried by said first member separating a chamber from the remaining portions of said cavity, said chamber being charged with gas under pressure, one part of said remaining portions being filled with liquid and the other parts thereof with gas, a movable pressure responsive element separating said liquid and gas in said remaining portions, a liquid reservoir in one of said members, and pumping means between said reservoir and said one part connected to said floating element, said pumping means being actuated by relative movement between said floating element and one member beyond a predetermined relative position for pumping liquid from said reservoir to said one part.

3. A shock absorber comprising first and second relatively movable telescoping members cooperating to define a fluid cavity, a floating element carried by said first member, separating a chamber from the remaining portion of said cavity, said chamber being charged with gas under pressure, one part of said remaining portions being filled reservoir in one of said members, pumping means between said reservoir and said one part connected to said floating element, said pumping means being actuated by said relative movement for pumping liquid from said reservoir to said one part, and means automatically rendering said pumping means inoperative when the velocity of said relative movement is above a predetermined value.

4. A shock absorber comprising first and second telescoping members, a floating element movable relative to said members carried by said first member and cooperating therewith to define a first chamber charged with gas under pressure, said floating element providing a cylinder isolated from said first chamber, a floating piston dividing said cylinder into second and third chambers, said second chamber being charged with gas at a pressure less than the pressure in said first chamber, said telescoping members defining a fourth chamber filled with liquid and connected to said third chamber, a reservoir containing liquid, pumping means connected between said floating element and said second telescoping member cooperating to pump liquid from said reservoir to said fourth chamber upon relative movement between said floating element and second telescoping member beyond a predetermined relative position.

5. A shock absorber comprising first and second telescoping members, a floating element movable relative to said members carried by said first member and cooperating therewith to define a first chamber charged with gas under pressure, said floating element providing a cylinder isolated from said first chamber, a floating piston dividing said cylinder into second and third chambers, said second chamber being charged with gas at a pressure less than the pressure in said first chamber, said telescoping members defining a fourth chamber filled with liquid and connected to said third chamber by flow restriction means, a reservoir containing liquid, a cylinder and a piston, one carried by said floating element and the other by said second telescoping member and includes valve means cooperating to pump liquid from said reservoir to said fourth chamber upon relative movement between said floating element and second telescoping member beyond a predetermined relative position.

6. A shock absorber comprising first and second telescoping members, a floating element movable relative to said members carried by said first member and cooperating therewith to define a first chamber charged with gas under pressure, said floating element providing a cylinder isolated from said first chamber, a floating piston dividing said cylinder into second and third chambers, said second chamber being charged with gas at a pressure less than the pressure in said first chamber and said third chamber being filled with liquid, said telescoping members defining a fourth chamber filled with liquid and connected to said third chamber by flow restriction means, a reservoir containing liquid, and pumping means including an actuating member carried by said floating element for pumping liquid from said reservoir to said fourth chamber in response to relative motion between said floating element and said second member when said fourth chamber contains less than a predetermined amount of liquid.

7. A shock absorbing mechanism comprising a pair of relatively movable telescoping members, a variable volume chamber within said members completely filled with liquid, a liquid reservoir, a pump actuated by said relative movement connecting said chamber and reservoir operating to pump liquid from said reservoir into said chamber, first means associated with said pump sensing the volume of liquid contained in said chamber rendering said pump inoperative when said chamber contains more than a predetermined volume of liquid, and second means associated with said pump sensing the relative velocity between said members rendering said pump inoperative when the velocity of relative movement between said members is above a predetermined value.

References Cited in the file of this patent

UNITED STATES PATENTS

| | | |
|---|---|---|
| 1,179,253 | Westinghouse | Apr. 11, 1916 |
| 1,291,016 | Kellogg | Jan. 14, 1919 |
| 2,389,849 | Gruss | Nov. 27, 1945 |
| 2,436,573 | Heynes | Feb. 24, 1948 |
| 2,724,590 | Irwin | Nov. 22, 1955 |

FOREIGN PATENTS

| | | |
|---|---|---|
| 914,337 | France | June 17, 1946 |